(12) United States Patent
Maeda

(10) Patent No.: US 10,077,661 B2
(45) Date of Patent: Sep. 18, 2018

(54) BALANCE CORRECTION DEVICE FOR ROTOR

(71) Applicant: TOYOTA JIDOSHA KABUSHIKI KAISHA, Toyota-shi (JP)

(72) Inventor: Osamu Maeda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 251 days.

(21) Appl. No.: 15/196,187

(22) Filed: Jun. 29, 2016

(65) Prior Publication Data

US 2017/0009586 A1    Jan. 12, 2017

(30) Foreign Application Priority Data

Jul. 6, 2015 (JP) ................. 2015-135043

(51) Int. Cl.
*F01D 5/02* (2006.01)
*G01M 1/34* (2006.01)
(Continued)

(52) U.S. Cl.
CPC .......... *F01D 5/027* (2013.01); *B23K 26/0006* (2013.01); *B23K 26/0084* (2013.01); *B23K 26/0087* (2013.01); *B23K 26/0622* (2015.10); *B23K 26/0823* (2013.01); *B23K 26/0876* (2013.01); *B23K 26/352* (2015.10); *B23K 26/361* (2015.10); *G01M 1/326* (2013.01); *G01M 1/34* (2013.01); *B23K 2201/001* (2013.01); *B23K 2203/26* (2015.10); *B23K 2203/50* (2015.10); *B23P 15/006* (2013.01);
(Continued)

(58) Field of Classification Search
CPC ........... F01D 5/027; F16F 15/32; G01M 1/34; Y10T 29/37; Y10T 29/49316; Y10T 29/49325; Y10T 29/49327; Y10T 29/49329; Y10T 29/49764; Y10T 29/49771; Y10T 29/49774; B23K 26/0823; B23P 15/006; B23P 15/02; F05D 2230/13; F05D 2230/18
See application file for complete search history.

(56) References Cited

U.S. PATENT DOCUMENTS

| 5,267,140 A | 11/1993 | Ibe | |
|---|---|---|---|
| 2016/0325402 A1* | 11/2016 | Mitchell, Jr. | ........... B24C 1/045 |
| 2016/0363134 A1* | 12/2016 | Seike | ...................... F01D 5/027 |

FOREIGN PATENT DOCUMENTS

| JP | H04-142432 A | 5/1992 |
|---|---|---|
| JP | 2002-038968 A | 2/2002 |

(Continued)

*Primary Examiner* — Matthew P Travers
(74) *Attorney, Agent, or Firm* — Oblon, McClelland, Maier & Neustadt, L.L.P.

(57) ABSTRACT

A single-body balance correction range in which a weight has been removed by single-body balance correction performed on a turbine wheel (a rotor) as a single body is calculated, an assembly balance correction range is calculated in an assembled state of the turbine wheel, and assembly balance correction is performed in a case where the single-body balance correction range and the assembly balance correction range overlap each other, such that an outermost diameter of an arc-shaped assembly-balance correction groove provided by removal of an inner part of a turbine wheel head is smaller than a remaining height a of the single-body balance correction range.

2 Claims, 8 Drawing Sheets

(51) Int. Cl.
- *B23P 15/00* (2006.01)
- *B23K 26/352* (2014.01)
- *B23K 26/00* (2014.01)
- *B23K 26/0622* (2014.01)
- *B23K 26/08* (2014.01)
- *B23K 26/361* (2014.01)
- *G01M 1/32* (2006.01)
- *B23K 101/00* (2006.01)
- *B23K 103/18* (2006.01)
- *B23K 103/00* (2006.01)

(52) U.S. Cl.
CPC ...... *F05D 2220/40* (2013.01); *F05D 2230/13* (2013.01); *F05D 2270/821* (2013.01)

(56) References Cited

FOREIGN PATENT DOCUMENTS

| | | |
|---|---|---|
| JP | 2011-112514 | 6/2011 |
| JP | 2012-154671 A | 8/2012 |

\* cited by examiner

BLADE BACK FACE
201
e
201a : HEAD e    SINGLE-BODY BALANCE
     CORRECTION RANGE e
201a

BALANCE CORRECTION DEVICE FOR ROTOR

INCORPORATION BY REFERENCE

The disclosure of Japanese Patent Application No. 2015-135043 filed on Jul. 6, 2015 including the specification, drawings and abstract is incorporated herein by reference in its entirety.

BACKGROUND

1. Technical Field

The present disclosure relates to a balance correction device that corrects balance of a rotor.

2. Description of Related Art

As a balance correction device, there is a device that corrects imbalance of a rotor in such a manner that: an imbalance amount and an imbalance correction position of a rotor are measured; the imbalance correction position of the rotor is irradiated with a laser beam in a state where the rotor is rotated; and a weight at the imbalance correction position is removed (see, for example, Japanese Patent Application Publication No. 2011-112514 (JP 2011-112514 A)).

In the balance correction of the rotor, the balance correction may be performed on the rotor as a single body before the balance correction is performed in an assembled state of the rotor. In this case, a single-body balance correction range (a weight removal range) of the rotor as a single body may overlap with an assembly balance correction range in the assembled state of the rotor. In a case where a weight is to be removed to correct assembly balance in a state where the balance correction ranges overlap each other, an indicated value of a weight removal amount may deviate from an actual weight removal amount because a weight of an assembly balance correction part has been already removed by single-body balance correction.

SUMMARY

The present disclosure has been accomplished in consideration of the above-mentioned circumstances. The present disclosure provides a balance correction device that can restrain a difference between an indicated value of a weight removal amount and an actual weight removal amount even in a case where single-body balance correction is performed on a rotor as a single body before assembly balance correction is performed in an assembled state of the rotor.

In view of this, one aspect provides a balance correction device including a controller. The controller is configured to: (i) calculate a single-body balance correction range in which a weight has been removed by single-body balance correction performed on a rotor as a single body; (ii) calculate an assembly balance correction range in an assembled state of the rotor; (iii) calculate a remaining height of the single-body balance correction range from a rotation center of the rotor; and (iv) perform assembly balance correction such that an inner part of the rotor relative to an outer peripheral edge of the rotor is removed in an arc shape around the rotation center of the rotor. Further, the controller is configured to (v) perform assembly balance correction in a case where the single-body balance correction range and the assembly balance correction range overlap each other, such that an outermost diameter of an arc-shaped assembly-balance correction groove provided by the removal of the inner part of the rotor is smaller than the remaining height of the single-body balance correction range.

According to the balance correction device, in a case where the single-body balance correction range and the assembly balance correction range overlap each other, the assembly balance correction is performed such that the outermost diameter of the assembly-balance correction groove becomes smaller than the remaining height of the single-body balance correction range. This makes it possible to perform weight removal for the assembly balance correction by excluding a range in which a weight has been removed by single-body balance correction. Hereby, it is possible to restrain an indicated value of a weight removal amount from deviating from an actual weight removal amount, thereby making it possible to improve accuracy of the assembly balance correction.

Further, in the balance correction device, the controller may be configured to set the outermost diameter of the arc-shaped assembly-balance correction groove such that a difference is a predetermined value, in a case where the single-body balance correction range and the assembly balance correction range overlap each other. Here, the difference may be between the remaining height of the single-body balance correction range and a length, in a remaining-height direction, of a groove outer peripheral end of the arc-shaped assembly-balance correction groove. The groove outer peripheral end may be a groove outer peripheral end on a side closer to the single-body balance correction range. According to such setting, it is possible to set a weight removal range to be more outward in a radial direction (a radius of the weight removal range can be made large). This makes it possible to improve assembly imbalance removal efficiency.

According to the balance correction device, even in a case where single balance correction is performed on the rotor as a single body before assembly balance correction is performed in an assembled state of the rotor, it is possible to restrain an indicated value of a weight removal amount from deviating from an actual weight removal amount.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
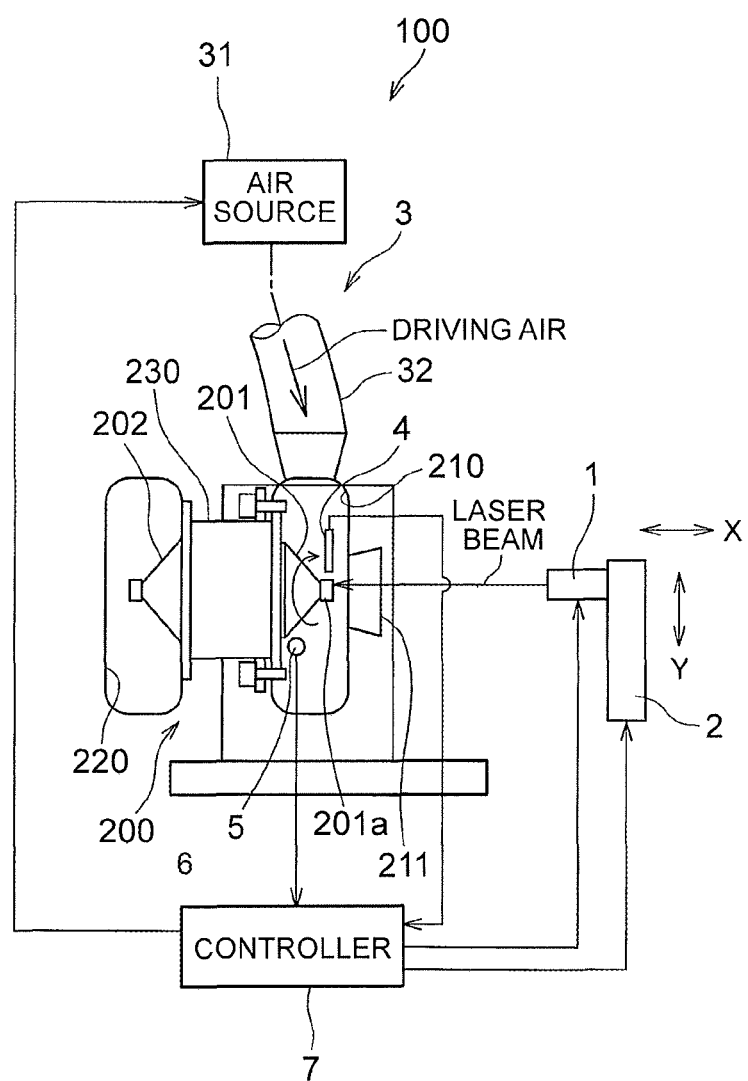
FIG. 1 is a schematic configuration diagram illustrating one example of a balance correction device.

Embodiments are described below with reference to the drawings. Initially described is a turbocharger 200 on which balance correction is performed, as an example, with reference to FIG. 1.

The turbocharger 200 in this example is constituted by a turbine wheel (e.g., made of Inconel (registered trademark)) 201, a compressor impeller (e.g., made of aluminum alloy) 202, and so on. The compressor impeller 202 is connected to an end of a turbine shaft (not shown) provided integrally with the turbine wheel 201. The turbine wheel 201 is accommodated in a turbine housing 210, and the compressor impeller 202 is accommodated in a compressor housing 220. A channel (a scroll) through which a fluid flows is provided in the turbine housing 210. The fluid rotationally drives the turbine wheel 201.

Further, a bearing (not shown) that supports the turbine shaft is accommodated in a center housing 230, and the turbine housing 210 and the compressor housing 220 are attached to both sides of the center housing 230.

A balance correction device 100 of the present embodiment is a device that corrects balance of a rotor (more specifically, the turbine wheel 201) in an assembled state. The balance correction device 100 includes a laser oscillator 1, a laser moving device 2, a driving air feeder 3, a rotation sensor 4, an acceleration sensor 5, a trestle 6, a controller 7, and so on.

The trestle 6 can support the turbocharger 200 releasably. In a state where the turbocharger 200 is supported by the trestle 6, a rotation center of the turbocharger 200 (a rotation center of the turbine wheel 201) is along a horizontal direction (an X-direction).

The laser oscillator 1 is a semiconductor laser that can generate a pulse, for example. The laser oscillator 1 is placed such that its optical axis is along the horizontal direction (a direction parallel to a rotation axis of the turbine wheel 201). The laser oscillator 1 can irradiate a columnar head 201a (hereinafter also referred to as a turbine wheel head 201a) of the turbine wheel (the rotor) 201 of the turbocharger 200 attached to the trestle 6 with a pulsed laser beam (hereinafter just referred to as a "laser beam") from a rotation-axis direction (the X-direction) of the turbine wheel 201. A part of the turbine wheel head 201a can be removed by the laser irradiation. Driving of the laser oscillator 1 is controlled by the controller 7.

Note that the laser beam emitted from the laser oscillator 1 passes through a discharge port 211 of the turbine housing 210 so as to be applied to the head 201a of the turbine wheel 201 inside the housing.

The laser moving device 2 moves the laser oscillator 1 in a radial direction of the turbine wheel 201 (in a direction perpendicular to the rotation axis of the turbine wheel 201: a Y-direction). When the laser moving device 2 moves the laser oscillator 1, a laser irradiation position with respect to the turbine wheel 201 can be moved and set in the radial direction of the turbine wheel 201.

The driving air feeder 3 includes an air source 31, an air duct 32, and so on. The air duct 32 is connected to a scroll inlet of the turbine housing 210, so that driving air from the air source 31 can be supplied to a scroll of the turbine housing 210. By supplying the driving air to the scroll, the driving air flows through the turbine wheel 201 to rotate the turbine wheel 201. A rotation speed of the turbine wheel 201 can be set changeably by adjusting a flow rate of the driving air output from the air source 31 (a flow rate of the driving air to flow through the turbine wheel 201). The flow rate of the driving air output from the air source 31 is controlled by the controller 7.

The rotation sensor 4 is a magnetic sensor, for example, and placed in the vicinity of the turbine wheel head 201a of the turbocharger 200 mounted to the trestle 6. The rotation sensor 4 detects a phase (a rotation angle) from the after-mentioned rotation reference S (see FIG. 3). A rotation angle and a rotation speed (a turbine rotation speed) of the turbine wheel 201 can be measured based on an output signal from the rotation sensor 4. The output signal from the rotation sensor 4 is input into the controller 7. Note that the rotation angle detected by the rotation sensor 4 changes from 0 degrees to 360 degrees when the turbine wheel head 201a makes one rotation from the rotation reference S (=0 degrees).

The acceleration sensor 5 is attached to the trestle 6 that supports the turbocharger 200. The acceleration sensor 5 detects vibrations of the trestle 6 (an acceleration of the rotor) at the time when the turbocharger 200 (the turbine wheel 201) rotates. An output signal from the acceleration sensor 5 is input into the controller 7.

The controller 7 is a personal computer, for example, and includes a CPU (Central Processing Unit), a ROM (Read Only Memory), a RAM (Random Access Memory), a backup RAM, a timer that counts time, an input-output interface, and so on.

The CPU performs a computing process based on various control programs, maps, and the like stored in the ROM. The ROM stores therein various control programs, maps referred to when such various control programs are executed, and so on. The RAM is a memory in which to temporarily store a computing result and the like by the CPU. The backup RAM is a nonvolatile memory in which to store data and the like to be stored when the controller 7 is turned off.

The laser oscillator 1, the laser moving device 2, the driving air feeder 3, the rotation sensor 4, the acceleration sensor 5, and so on are connected to the input-output interface of the controller 7.

The following describes assembly balance correction as a first embodiment. Here, before the description of an assembly balance correction process, laser irradiation with respect to the turbine wheel head 201a is described.

In the first embodiment, based on an output signal from the rotation sensor 4, an output timing (an irradiation timing of the laser beam) of the laser oscillator 1 is controlled.

More specifically, at the time when the turbine wheel head 201*a* rotates, an assembly imbalance correction position (calculated by the after-mentioned process) rotates. Therefore, the assembly imbalance correction position passes an optical axis (a laser irradiation position) of the laser oscillator 1 every predetermined time. Accordingly, the laser oscillator 1 is controlled so that the pulsed laser beam is applied at the time when the assembly imbalance correction position is placed at the laser irradiation position. Hereby, a weight at the assembly imbalance correction position can be removed.

However, the turbine wheel head 201*a* rotates and the pulsed laser beam has a time width (pulse duration). Therefore, if an output of the pulsed laser beam is started at the time when the assembly imbalance correction position comes at the laser irradiation position, a part to be removed by the laser irradiation deviates from the assembly imbalance correction position in a rotation direction. In view of this, in the first embodiment, the output of the pulsed laser beam (output of one pulse) is started at a timing of "−β/2 degree" with respect to the assembly imbalance correction position, and the output of the pulsed laser beam is finished at a timing of "−β/2 degree."

By applying the pulsed laser beam in sync with the turbine wheel head 201*a* as described above, an arc-shaped groove C (see FIGS. 4 to 6) around a rotation center O of the turbine wheel head 201*a* is provided in the turbine wheel head 201*a*. Note that an angle range β (see FIGS. 4 to 6) of the groove C will be described later.

Next will be described the assembly balance correction.

Figure 9A:
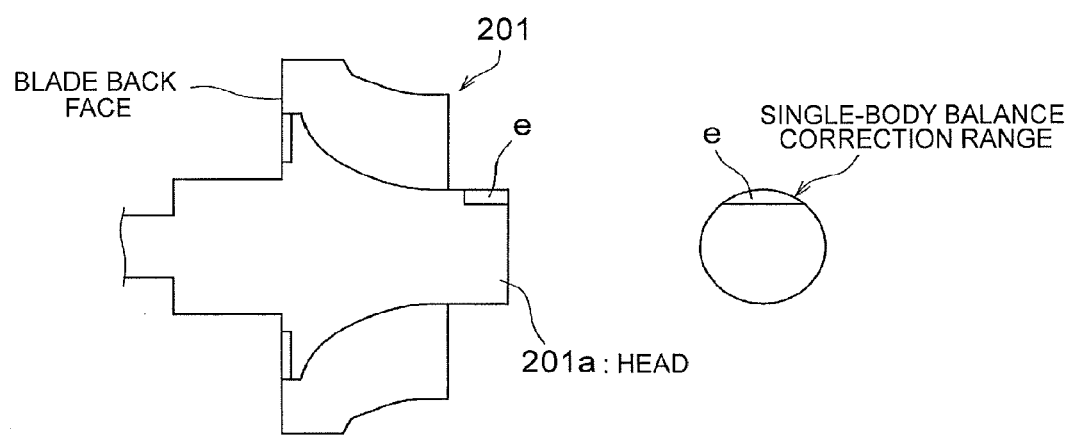
FIG. 9A is a sectional view of a turbine wheel on which single-body balance correction is performed in the above embodiment.
Figure 9B:
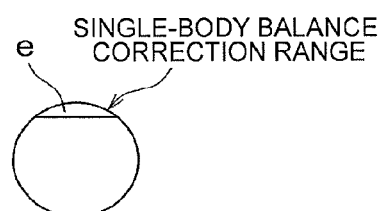
FIG. 9B is a sectional view of a head of the turbine wheel in the above embodiment (a hatching indicative of a section is omitted)
Figure 9C:
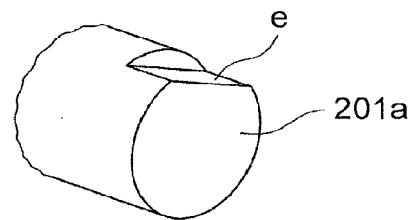
FIG. 9C is a perspective view of the head of the turbine wheel in the above embodiment.

First, as illustrated FIGS. 9A to 9C, a weight is removed by single-body balance correction performed on a single body, from the turbine wheel 201 as a target of the assembly balance correction. The balance correction on the turbine wheel 201 as a single body is performed on two surfaces, i.e., the turbine wheel head 201*a* and a blade back face as illustrated in FIG. 9A. The single-body balance correction on the turbine wheel head 201*a* is performed by removing an outer peripheral portion of the turbine wheel head 201*a* as illustrated in FIGS. 9B and 9C, and a removed part obtained herein has a single-body balance correction trace e (a single-body balance correction range) having a semicircular shape. Note that a hatching indicative of a section is omitted in FIGS. 9A to 9C.

Figure 10:
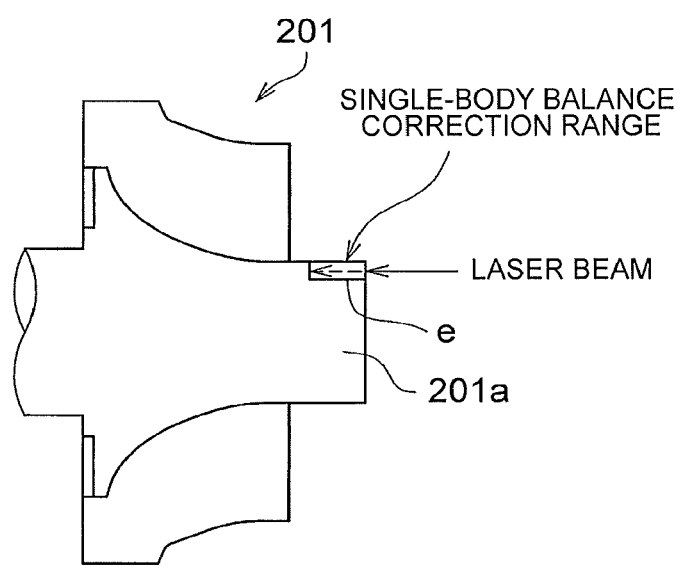
FIG. 10 is a view schematically illustrating an example in which the single-body balance correction range and the assembly balance correction range (a laser irradiation position) overlap each other in the above embodiment.

In a case where the turbine wheel 201 on which the single-body balance correction is performed as such is subjected to assembly balance correction in an assembled state (a state where the turbine wheel 201 is assembled to the turbocharger 200), if an assembly balance correction range (a laser irradiation position) overlaps (accords) with the single-body balance correction range as illustrated in FIG. 10, a positioned laser beam is out of focus because a weight in the assembly balance correction range (an assembly balance correction part) has been already removed by the single-body balance correction. This results in that an actual weight removal amount is reduced (deviates) from an indicated value of a weight removal amount.

Assembly balance correction that solves such a problem will be described below with reference to a flowchart of FIG. 2. A control routine of FIG. 2 is executed by the controller 7.

Figure 2:
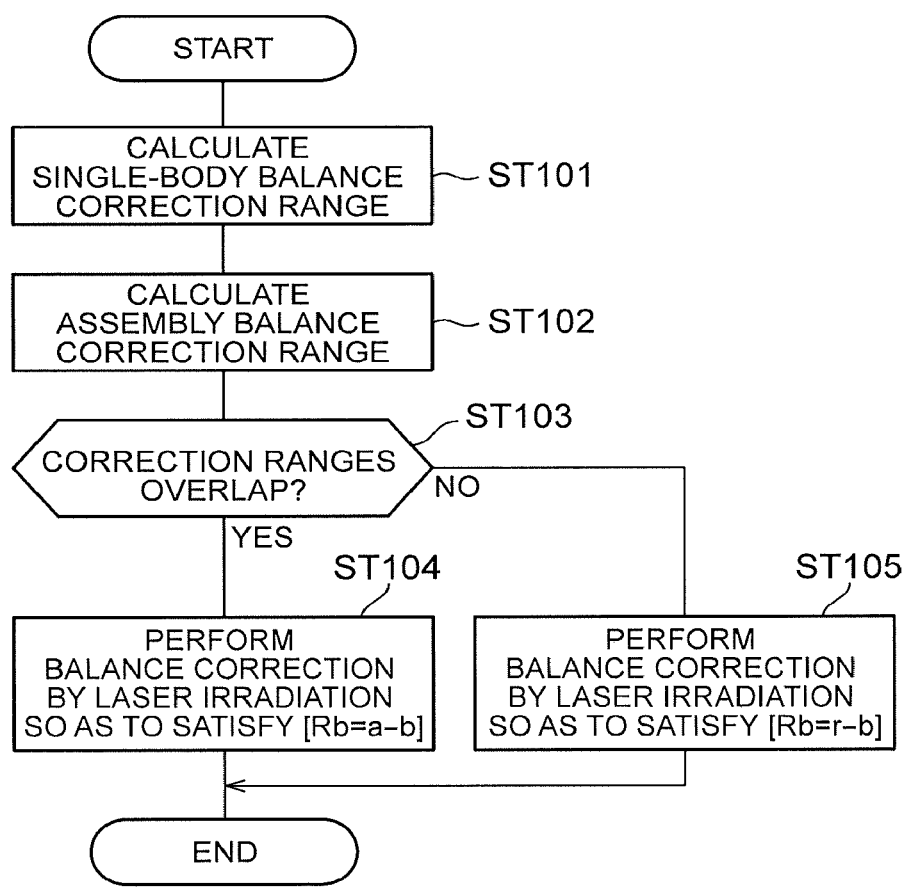
FIG. 2 is a flowchart illustrating one example of a process content of assembly balance correction in a first embodiment.

When the control routine of FIG. 2 is started, a single-body balance correction range is first calculated in step ST101. Then, an assembly balance correction range is calculated in step ST102.

In step ST103, it is determined whether the single-body balance correction range calculated in step ST101 and the assembly balance correction range calculated in step ST102 overlap each other or not. When a determination result is an affirmative determination (YES), the process proceeds to step ST104. In step ST104, a laser beam is applied to perform balance correction so that an outermost diameter Rb of a groove (an assembly-balance correction groove C: see FIG. 4) provided by the after-mentioned laser irradiation becomes [Rb=a−b]. Note that [Rb=a−b] will be described later.

In the meantime, when the determination result in step ST103 is a negative determination (NO), the process proceeds to step ST105. In step ST105, the laser beam is applied to perform balance correction so that an outermost diameter Rb of a groove (an assembly-balance correction groove C: see FIG. 6) provided by the after-mentioned laser irradiation becomes [Rb=r−b]. Note that [Rb=r−b] will be described later.

Respective process contents of step ST101 to step ST105 are described below in detail.

Initially, the following describes ST101. As a process before the assembly balance correction is performed, the turbocharger 200 is attached to the trestle 6 of the balance correction device 100 as illustrated in FIG. 1. The turbocharger 200 is an assembly balance correction object.

After the attachment of the turbocharger 200 is finished, the assembly balance correction is started. When the assembly balance correction is started, the controller 7 controls the driving air feeder 3 to rotate the turbine wheel 201 by driving air. In a state where its turbine rotation speed is kept at the after-mentioned rotation speed (a constant rotation speed) for the assembly balance correction, an output signal of the rotation sensor 4 is extracted. The controller 7 then calculates a single-body balance correction range by the following technique based on extracted rotation signal data.

Figure 3:
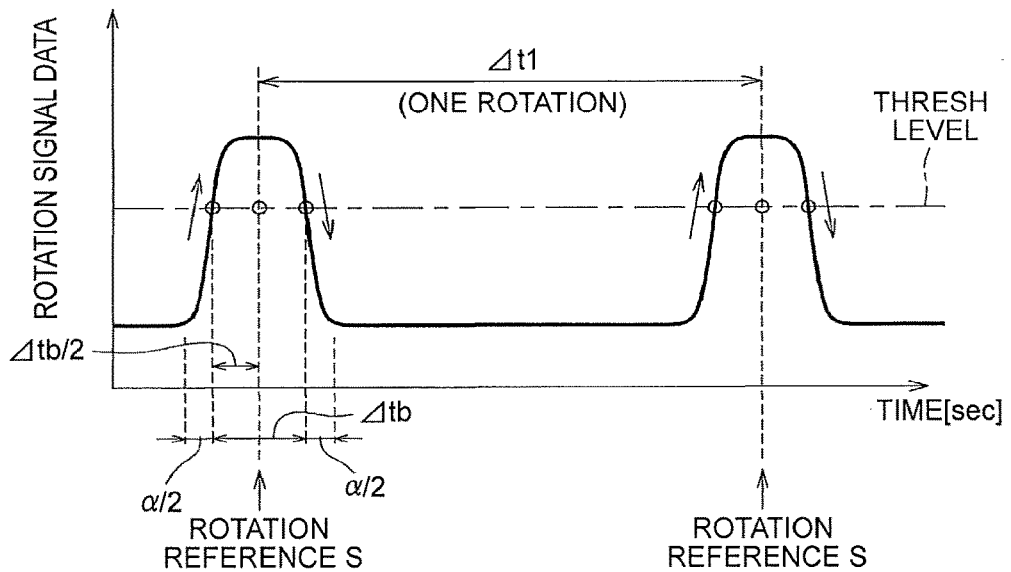
FIG. 3 is a waveform diagram of rotation signal data in the first embodiment.

First, rotation signal data in which a single-body balance correction trace e is detected by the rotation sensor 4 is illustrated in FIG. 3. As illustrated in FIG. 3, in a rotational process of the turbine wheel head 201*a*, the rotation sensor 4 outputs a mound-shaped pulse signal each time the single-body balance correction trace e (see FIG. 4 and so on) passes the rotation sensor 4 (each time the turbine wheel head 201*a* makes one rotation). In the first embodiment, respective times at which an upslope and a downslope of the pulse signal accord with a thresh level are measured and a time interval Δtb therebetween is calculated. A single-body imbalance exists in an intermediate time phase (Δtb/2) of the time interval Δtb thus calculated. In view of this, the intermediate time phase is recognized as a rotation reference S (a rotation reference S of the rotation sensor 4), and a time interval Δt1 of the rotation reference S (a time required for one rotation: sec) is calculated.

Further, as illustrated in FIG. 3, a range in which a weight has been removed as the single-body imbalance (a range of the single-body balance correction trace e) becomes Δtb+α (sec). Note that α is a value in which the thresh level is taken into consideration. When this range is converted into a phase range 2θ illustrated in FIG. 4, the following formula is obtained:

$$2\theta = ((\Delta tb + \alpha)/\Delta t1) \times 360 [\text{deg}] \qquad (1).$$

Then, the controller 7 finds [Δtb+α] (sec) and Δt1 (sec) based on the rotation signal data, and calculates the phase range 2θ (hereinafter also referred to as the single-body balance correction range) of the single-body balance correction from Formula (1). A calculation result of the single-body balance correction range is stored in the RAM, for example.

Note that step ST101 of the assembly balance correction process (FIG. 2) executed by the controller 7 corresponds to a "single-body balance correction range calculation process".

Next will be described step ST102. After the imbalance determination is finished, the calculation process (ST102) of the assembly balance correction range is executed in a state where the turbocharger 200 is attached to the trestle 6. The calculation process of the assembly balance correction range by the controller 7 is described below. The following description is made without the flowchart of the figure, but with step numbers.

First, the following calculation process is performed as ST121. The driving air feeder 3 is controlled to rotate the turbine wheel 201 by driving air, so that a rotation speed (a turbine rotation speed) of the turbine wheel 201 is increased. In a predetermined rotation speed range during the increase of the turbine rotation speed, an output signal of the rotation sensor 4 and an output signal of the acceleration sensor 5 are extracted. Based on rotation data and acceleration data (vibrational data) thus extracted by such a tracking operation, an imbalance amount (an amplitude of an acceleration (vibration)) and an imbalance phase (angle) with respect to the rotation reference S (see FIG. 3) recognized by the above process are found.

Subsequently, the following calculation process is performed as ST122. The laser oscillator 1 and the laser moving device 2 are controlled to perform dummy irradiation of a one-pulse laser beam with respect to a given phase position of the turbine wheel head 201a. Hereby, a part of the turbine wheel head 201a is removed. After that, an output signal of the rotation sensor 4 and an output signal of the acceleration sensor 5 are extracted by a tracking operation similar to the above. Based on rotation data and acceleration data thus extracted, an imbalance amount (an amplitude of an acceleration (vibration)) and an imbalance phase (angle) with respect to the rotation reference (see FIG. 3) recognized by the above process are found.

Subsequently, a calculation process of ST123 is performed. An assembly imbalance correction amount (a weight removal amount) and an assembly imbalance correction position (hereinafter also referred to as an assembly imbalance correction phase) with respect to the rotation reference S are calculated by a well-known technique based on a difference (a change in the imbalance amount before and after the dummy irradiation) between the imbalance amount provided in the process of ST121 and the imbalance amount provided in the process of ST122 and based on a difference (an imbalance phase change before and after the dummy irradiation) between the imbalance phase provided in the process of ST121 and the imbalance phase provided in the process of ST122.

Subsequently, a calculation process of ST124 is performed. Based on a pulse duration tp (sec) of one pulse of the pulsed laser beam and a turbine rotation speed Nt (rpm) at the time of the assembly balance correction, a range β (an assembly-balance correction groove range β) of a groove C having an arc shape (an arc shape around the rotation center O of the turbine wheel head 201a) (see FIGS. 4 to 6) provided by the pulsed laser irradiation is calculated from Formula (2):

$$\beta = (Nt/60) \times tp \times 360 [\deg] \quad (2).$$

Here, the assembly-balance correction groove range β is a range from the −β/2 phase to the β/2 phase in the rotation direction around a center of the assembly imbalance correction phase with respect to the rotation reference S.

Calculation results of the assembly imbalance correction phase and the assembly-balance correction groove range β (hereinafter also referred to as the assembly balance correction range) calculated in step ST102 are stored in the RAM, for example.

Note that step ST102 of the assembly balance correction process (FIG. 2) executed by the controller 7 corresponds to an "assembly balance correction range calculation process".

Next will be described step ST103. In step ST103, it is determined whether the single-body balance correction range calculated in step ST101 and the assembly balance correction range calculated in step ST102 overlap each other in the radial direction (the Y-direction) or not.

Figure 4:
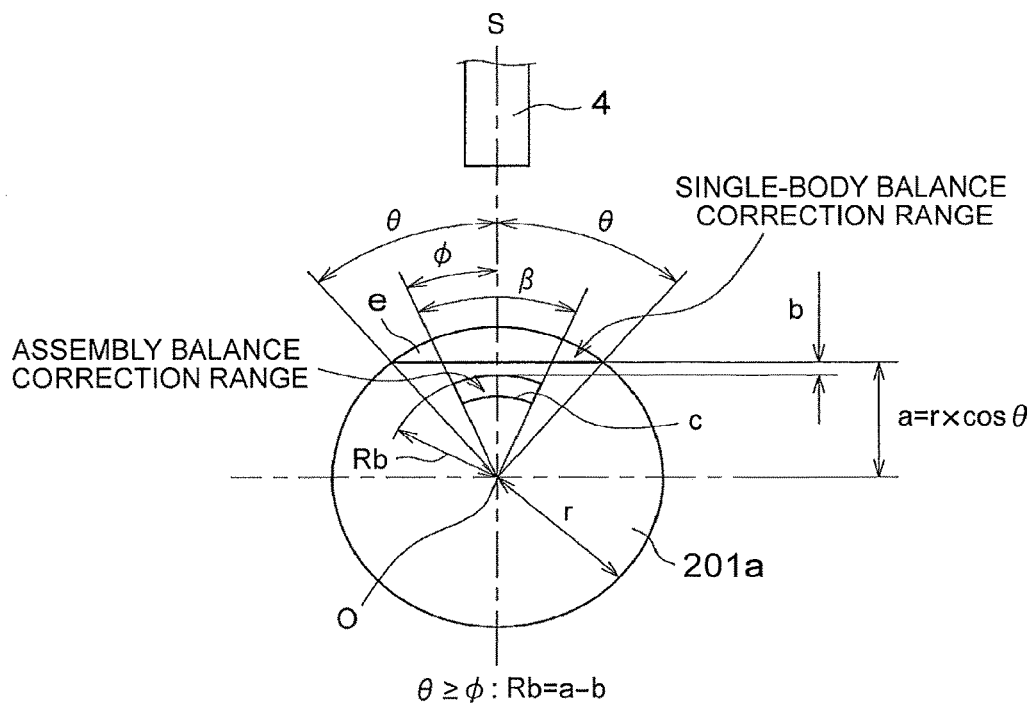
FIG. 4 is a view illustrating one example of the assembly balance correction in a case where a single-body balance correction range and an assembly balance correction range overlap each other in the first embodiment.
Figure 5:
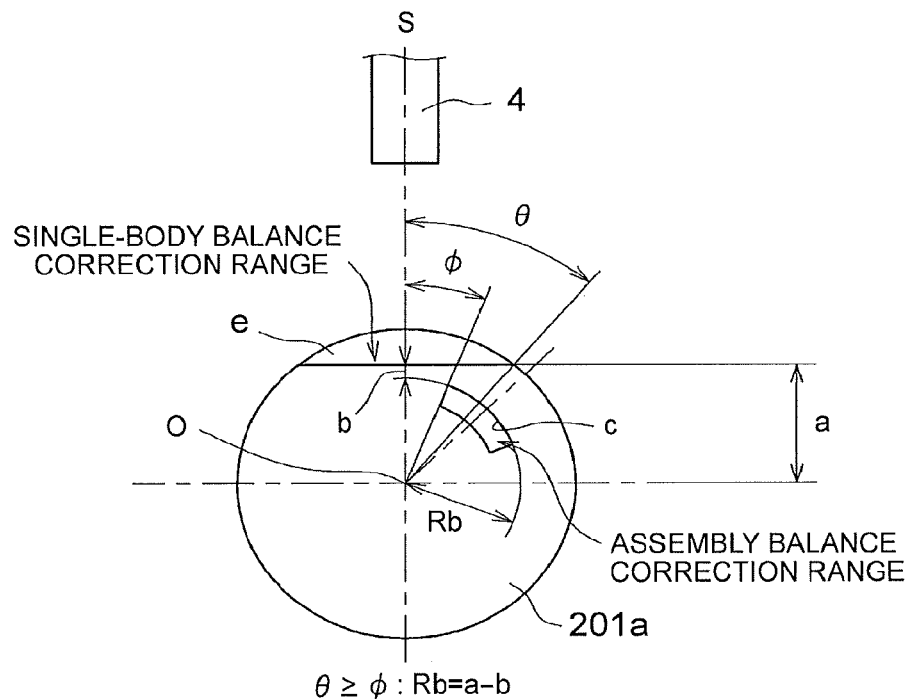
FIG. 5 is a view illustrating another example of the assembly balance correction in a case where the single-body balance correction range and the assembly balance correction range overlap each other.
Figure 6:
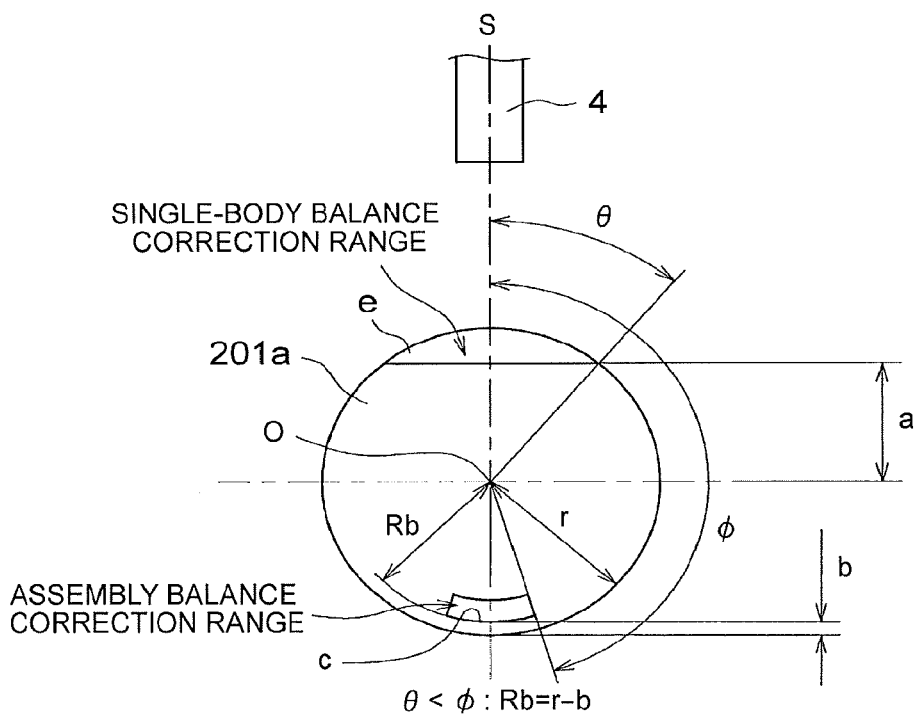
FIG. 6 is a view illustrating one example of the assembly balance correction in a case where the single-body balance correction range and the assembly balance correction range do not overlap each other.

More specifically, by use of the assembly imbalance correction phase (a phase with respect to the rotation reference S) calculated in step ST123 and an assembly-balance correction groove end phase β/2 with respect to the assembly imbalance correction phase, the controller 7 calculates a phase (an assembly-balance correction groove end phase) ϕ of an assembly-balance correction groove end with respect to the rotation reference S as illustrated in FIGS. 4 to 6. Then, the controller 7 determines whether the assembly-balance correction groove end phase ϕ overlaps with the phase range 2θ of the single-body balance correction or not (it is determined whether θ≥ϕ is satisfied or not). Note that, in a state shown in FIG. 4, the rotation reference S accords with the assembly imbalance correction phase, and ϕ is β/2.

When the determination result is an affirmative determination (YES) (θ≥ϕ) that is, when the single-body balance correction range and the assembly balance correction range overlap each other in the radial direction (the Y-direction) (e.g., states illustrated in FIGS. 4 and 5), the process proceeds to step ST104. In the meantime, when the determination result in step ST103 is a negative determination (NO) (θ<ϕ), that is, when the single-body balance correction range and the assembly balance correction range do not overlap each other (e.g., a state illustrated in FIG. 6), the process proceeds to step ST105.

Next will be described step ST104. First, in step ST104, a remaining height a illustrated in FIG. 4 is calculated. More specifically, by use of a radius r of the turbine wheel head 201a and the phase range 2θ of the single-body balance correction, the controller 7 calculates a remaining height a [a=r cos θ] of the single-body balance correction range (a weight removal range) from the rotation center O of the turbine wheel head 201a. By use of the remaining height a and a predetermined value b, an outermost diameter Rb [Rb=a−b] of the assembly-balance correction groove C as illustrated in FIGS. 4 and 5 is calculated.

Note that it is preferable that the predetermined value b be small in order that a weight removal range in the assembly balance correction is set on a possibly outer side in the radial direction (to increase a radius of the weight removal range). However, if the predetermined value b is made too small, a strength (a strength of a remaining outer wall) of an outer peripheral portion of the assembly-balance correction groove C decreases. This may result in that the outer wall of the outer peripheral portion of the assembly-balance correction groove C deforms more outward due to a centrifugal force, in a use rotation range of the turbocharger 200. In consideration of this point, it is preferable that the predetermined value b be around 0.5 mm to 1.0 mm, for example.

Then, the controller 7 controls the laser moving device 2 to set a position of the laser oscillator 1 so that the outermost diameter Rb (see FIG. 4, etc.) of the assembly-balance correction groove C provided by the laser irradiation becomes [Rb=a−b], that is, the outermost diameter Rb of the assembly-balance correction groove C becomes smaller than the remaining height a of the single-body balance correction range (the single-body balance correction trace e). Further, the driving air feeder 3 is controlled to maintain the turbine rotation speed at the rotation speed (the constant rotation speed) for the assembly balance correction. In this state, the laser oscillator 1 is controlled based on an output signal of the rotation sensor 4 and a removal-amount indicated value, so as to remove a weight by irradiating the assembly imbalance correction position with the pulsed laser beam at the aforementioned irradiation timing. The laser irradiation is performed until a weight removal amount to be removed by the laser irradiation reaches the removal-amount indicated value. When the weight removal amount reaches the removal-amount indicated value, the assembly imbalance correction process is finished.

Note that the removal-amount indicated value is set based on the assembly imbalance correction amount (the weight removal amount) calculated by the process of (step ST123) described above. Further, the weight removal amount [removal amount/pulse] at the time of irradiation with a one-pulse laser beam is determined by a material of the turbine wheel head 201*a* and a laser output (energy) of the laser oscillator 1. On this account, an irradiation pulse number (an irradiation time of the laser beam with respect to the assembly imbalance correction position) that can remove the removal-amount indicated value (an assembly balance correction weight) is set from the [removal amount/pulse] so as to perform the laser irradiation.

Next will be described step ST105. In step ST105, the controller 7 calculates an outermost diameter Rb [Rb=r−b] of an assembly-balance correction groove C illustrated in FIG. 6 by use of the radius r of the turbine wheel head 201*a* and the predetermined value b. Note that a similar value used in the process of step ST104 is used as the predetermined value b.

Subsequently, the controller 7 controls the laser moving device 2 to set the position of the laser oscillator 1 so that the outermost diameter Rb of the assembly-balance correction groove C provided by the laser irradiation becomes [Rb=r−b]. Further, the controller 7 controls the driving air feeder 3 to maintain the turbine rotation speed at the rotation speed (the constant rotation speed) for the assembly balance correction. In this state, the laser oscillator 1 is controlled based on an output signal of the rotation sensor 4 and the removal-amount indicated value, so as to remove a weight by irradiating the assembly imbalance correction position with the pulsed laser beam at the aforementioned irradiation timing. The laser irradiation is performed until a weight removal amount to be removed by the laser irradiation reaches the removal-amount indicated value. When the weight removal amount reaches the removal-amount indicated value, the assembly imbalance correction process is finished.

Note that step ST103 and step ST104 of the assembly balance correction process (FIG. 2) executed by the controller 7 correspond to a "remaining height calculation process" and a "balance correction control process".

As described above, according to the first embodiment, in a case where the single-body balance correction range and the assembly balance correction range overlap each other, the assembly balance correction is performed by applying the laser beam so that the outermost diameter Rb of the assembly-balance correction groove C becomes smaller than the remaining height a of the single-body balance correction range. This makes it possible to perform weight removal for the assembly balance correction by excluding a range in which a weight has been removed by the single-body balance correction. Hereby, it is possible to restrain the indicated value of the weight removal amount from deviating from the actual weight removal amount, thereby making it possible to improve accuracy of the assembly balance correction.

Next will be described assembly balance correction as a second embodiment.

In the assembly balance correction in the first embodiment described above, in a case where the single-body balance correction range and the assembly balance correction range overlap each other, the laser irradiation is performed so that the outermost diameter Rb (see FIG. 4, etc.) of the assembly-balance correction groove C provided by the laser irradiation becomes [Rb=a−b]. In the meantime, in the second embodiment, an outermost diameter Rb of an arc-shaped assembly-balance correction groove C is set so that a difference between a remaining height of a single-body balance correction range and a length, in a remaining-height direction, of a groove outer peripheral end of the arc-shaped assembly-balance correction groove becomes a predetermined value. The groove outer peripheral end is a groove outer peripheral end on a side closer to the single-body balance correction range. This point will be described below.

Figure 8:
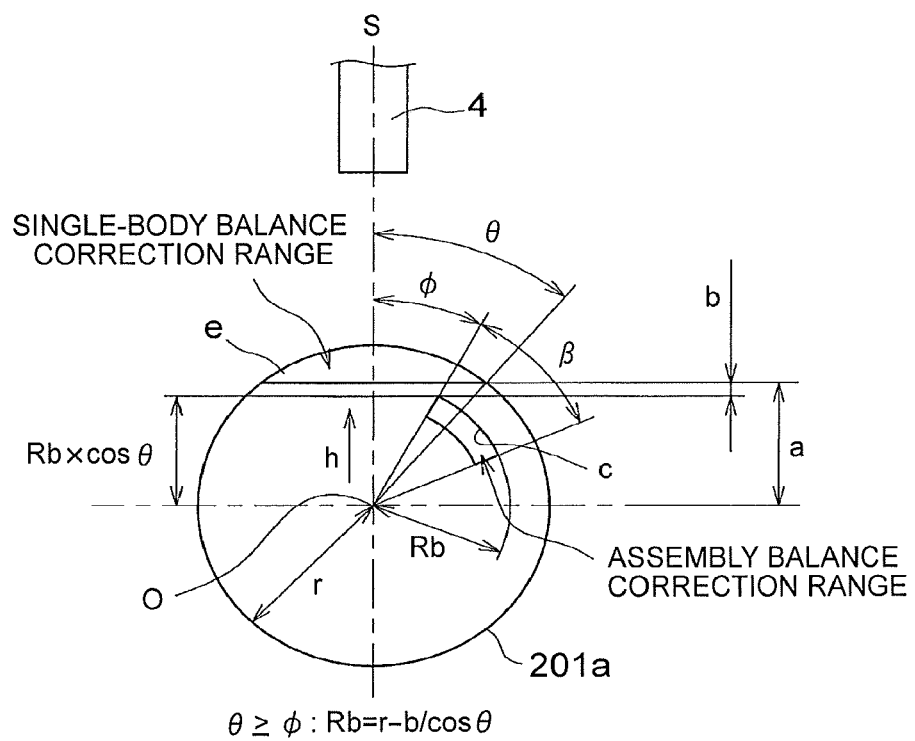
FIG. 8 is a view illustrating assembly balance correction in a case where a single-body balance correction range and an assembly balance correction range overlap each other in the second embodiment.

Initially, as described above, the remaining height a of the single-body balance correction range can be expressed as [a=r×cos θ]. Further, as illustrated in FIG. 8, the length (a rotation-reference-direction length), in the remaining-height direction (an h-direction), of the groove outer peripheral end of the arc-shaped assembly-balance correction groove C provided by laser irradiation can be expressed as [Rb×cos θ] by use of the outermost diameter Rb of the assembly-balance correction groove C. The groove outer peripheral end is a groove outer peripheral end on the side closer to the single-body balance correction range.

In this example, the outermost diameter Rb of the assembly-balance correction groove C is set so that a difference between the remaining height a of the single-body balance correction range and the rotation-reference-direction length Rb×cos θ of the groove outer peripheral end on the side closer to the single-body balance correction range becomes the predetermined value b.

How to set the outermost diameter Rb is described below. First, a relationship between the remaining height a, the rotation-reference-direction length Rb×cos θ, and the predetermined value b is expressed as follows:

$$Rb \times \cos \theta + b = a = r \times \cos \theta \quad (3).$$

When Formula (3) is transformed, the following formula is obtained:

$$Rb \times \cos \theta = r \times \cos \theta - b \Rightarrow Rb = r - b/\cos \theta \quad (4).$$

From Formula (4), it is possible to set the outermost diameter Rb of the assembly-balance correction groove C so that the difference between the remaining height a of the single-body balance correction range and the rotation-reference-direction length Rb×cos θ of the groove outer peripheral end on the side closer to the single-body balance correction range becomes the predetermined value b.

Next will be described the assembly balance correction of this example with reference to a flowchart of FIG. 7. A control routine of FIG. 7 is executed by the controller 7.

Figure 7:
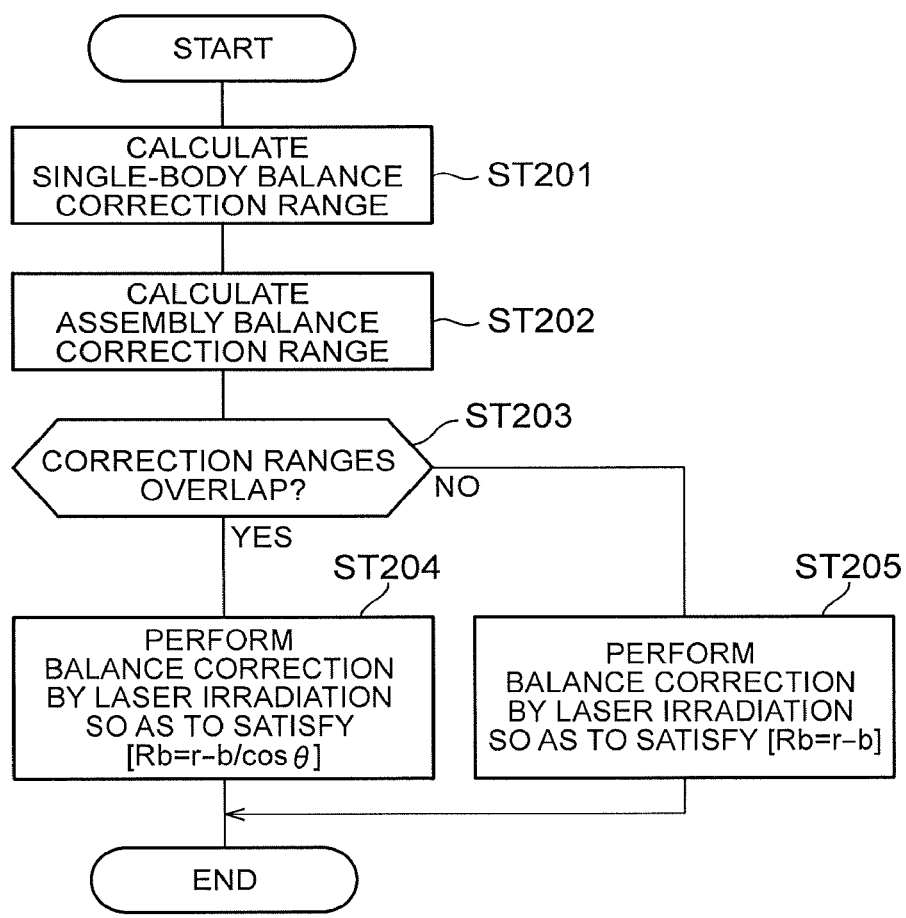
FIG. 7 is a flowchart illustrating one example of a process content of assembly balance correction in a second embodiment.

Step ST201 to step ST203 and step ST205 in the control routine of FIG. 7 are basically the same as step ST101 to step ST103 and step ST105 of FIG. 2, so detailed descriptions thereof are omitted herein.

Even in this example, when a determination result of step ST203 is an affirmative determination (YES) (in a case of θ≥φ), that is, when the single-body balance correction range and the assembly balance correction range overlap each other in the radial direction, the process proceeds to step ST204.

In step ST204, the controller 7 calculates an outermost diameter Rb [Rb=r−b/cos θ] of an assembly-balance correction groove C illustrated in FIG. 8 by use of the radius r of the turbine wheel head 201a, the phase range 2θ of the single-body balance correction, and a predetermined value b. Note that a similar value used in the process of step ST104 is used as the predetermined value b.

Subsequently, the controller 7 controls the laser moving device 2 to set the position of the laser oscillator 1 so that the outermost diameter Rb (see FIG. 8) of the assembly-balance correction groove C provided by the laser irradiation becomes [Rb=r−b/cos θ]. Further, the driving air feeder 3 is controlled to maintain a turbine rotation speed at the rotation speed for the assembly balance correction. In this state, the laser oscillator 1 is controlled based on an output signal of the rotation sensor 4 and the removal-amount indicated value, so as to remove a weight by irradiating the assembly imbalance correction position with the pulsed laser beam at the aforementioned irradiation timing. The laser irradiation is performed until a weight removal amount to be removed by the laser irradiation reaches the removal-amount indicated value. When the weight removal amount reaches the removal-amount indicated value, the assembly imbalance correction process is finished.

According to this example, it is possible to restrain the indicated value of the weight removal amount from deviating from an actual weight removal amount, thereby making it possible to improve accuracy of the assembly balance correction. Besides, the weight removal range (the assembly-balance correction groove C) by the laser irradiation can be set on a radially outer side relative to the case of [Assembly Balance Correction (1)] described above (the radius of the weight removal range can be made larger). This makes it possible to improve assembly imbalance removal efficiency.

It should be noted that the embodiments described herein are just examples in all respects and are not limitative. Accordingly, the technical scope of the present disclosure is not interpreted only by the first and second embodiments, but is defined based on the description in Claims. Further, the technical scope of the present disclosure includes all modifications made within the meaning and scope equivalent to Claims.

For example, the above embodiments deal with an example in which the balance correction device is used for assembly balance correction of the turbine wheel 201. However, the present disclosure is not limited to this, and may be applied to assembly balance correction of the compressor impeller 202. Further, the balance correction device may have a structure in which the turbine wheel 201 and the compressor impeller 202 individually include respective laser oscillators that emit a laser beam, so that assembly balance correction may be performed on both of the turbine wheel 201 and the compressor impeller 202.

The above embodiments deal with an example in which the balance correction device is applied to the assembly balance correction of the turbine wheel 201 and the compressor impeller 202 of the turbocharger 200. However, the present disclosure is not limited to this, and can be applied to assembly balance correction of any other rotors.

In the above embodiments, a weight is removed by laser irradiation. However, the present disclosure is not limited to this, and a weight may be removed by electric discharge machining, ion beam machining, or the like.

The present disclosure is usable as a balance correction device that corrects balance of a rotor such as a compressor impeller or a turbine wheel of a turbocharger.

What is claimed is:

1. A balance correction device comprising:
a controller configured to:
  (i) calculate a single-body balance correction range corresponding to a part of an outer peripheral portion of a rotor which has been removed by a single-body balance correction previously performed on the rotor as a single body to form a flat face extending parallel to a center line of rotation of the rotor;
  (ii) calculate an assembly balance correction range in an assembled state of the rotor;
  (iii) calculate a remaining height on an end surface perpendicular to the center line of rotation of the rotor, the remaining height being a distance between a rotation center position of the rotor and a point of the flat face in the single-body balance correction range, the point being a point at a shortest distance from the rotation center position of the rotor among points on the flat face in the single-body balance correction range;
  (iv) perform assembly balance correction such that an inner part of the rotor relative to an outer peripheral edge of the rotor is removed in an arc shape around the rotation center of the rotor; and
  (v) perform assembly balance correction in a case where the single-body balance correction range and the assembly balance correction range overlap each other, such that an outermost radius of an arc shaped assembly-balance correction groove provided by the removal of the inner part of the rotor is smaller than the remaining height of the single-body balance correction range.

2. The balance correction device according to claim 1, wherein
the controller is configured to set the outermost radius of the arc-shaped assembly-balance correction groove such that
in a case where the single-body balance correction range and the assembly balance correction range overlap each other, a difference between the remaining height of the single-body balance correction range and a distance, in a remaining-height direction, between a groove outer peripheral end of the arc-shaped assembly-balance correction groove and the rotation center position of the rotor, is a predetermined value, the groove outer peripheral end being a groove outer peripheral end on a side closer to the single-body balance correction range.

* * * * *